No. 808,112. PATENTED DEC. 26, 1905.
F. H. PIERPONT.
STANDARDIZING OR MEASURING MACHINE FOR MATRICES.
APPLICATION FILED APR. 29, 1903.
6 SHEETS—SHEET 1.
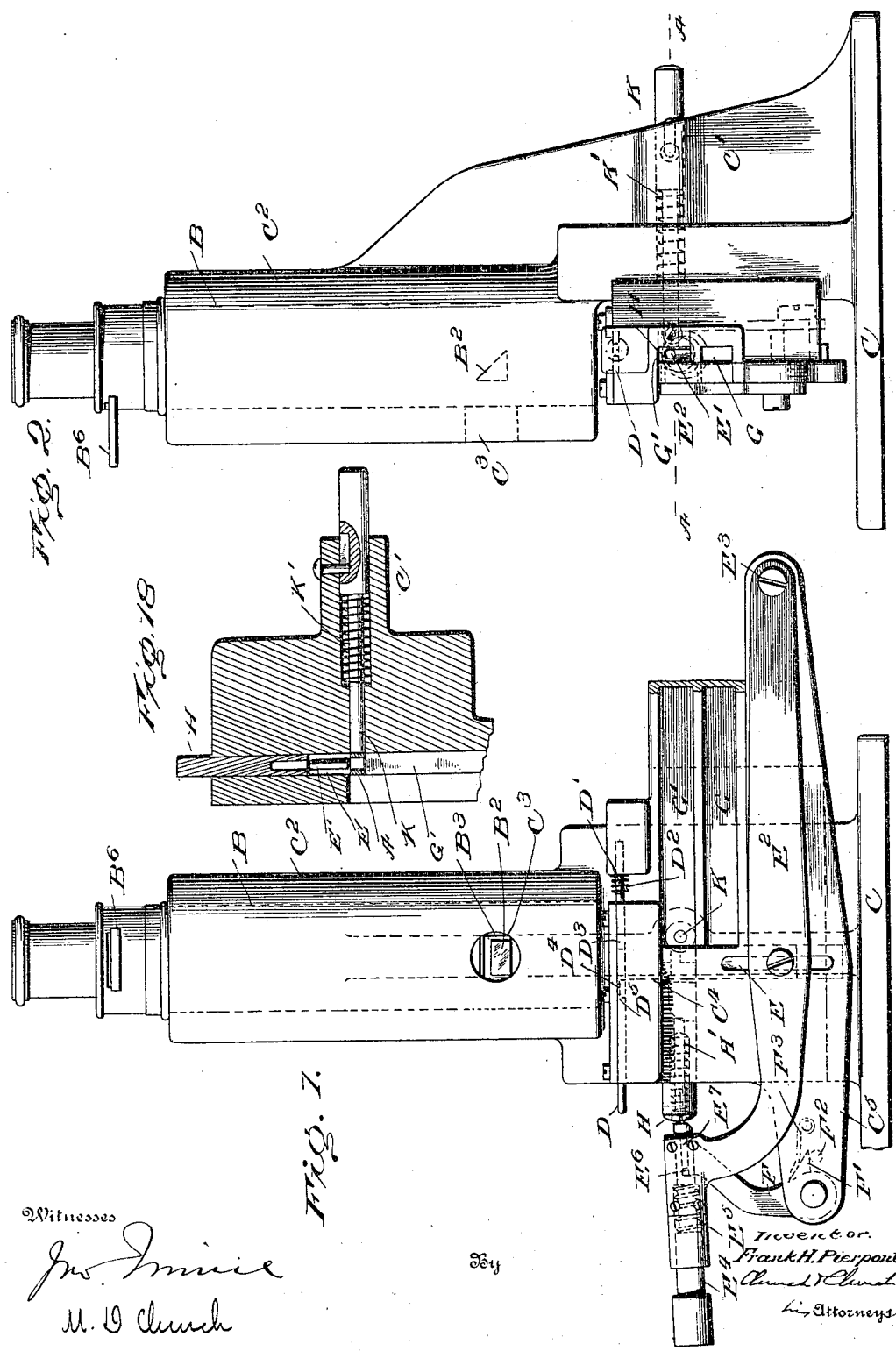

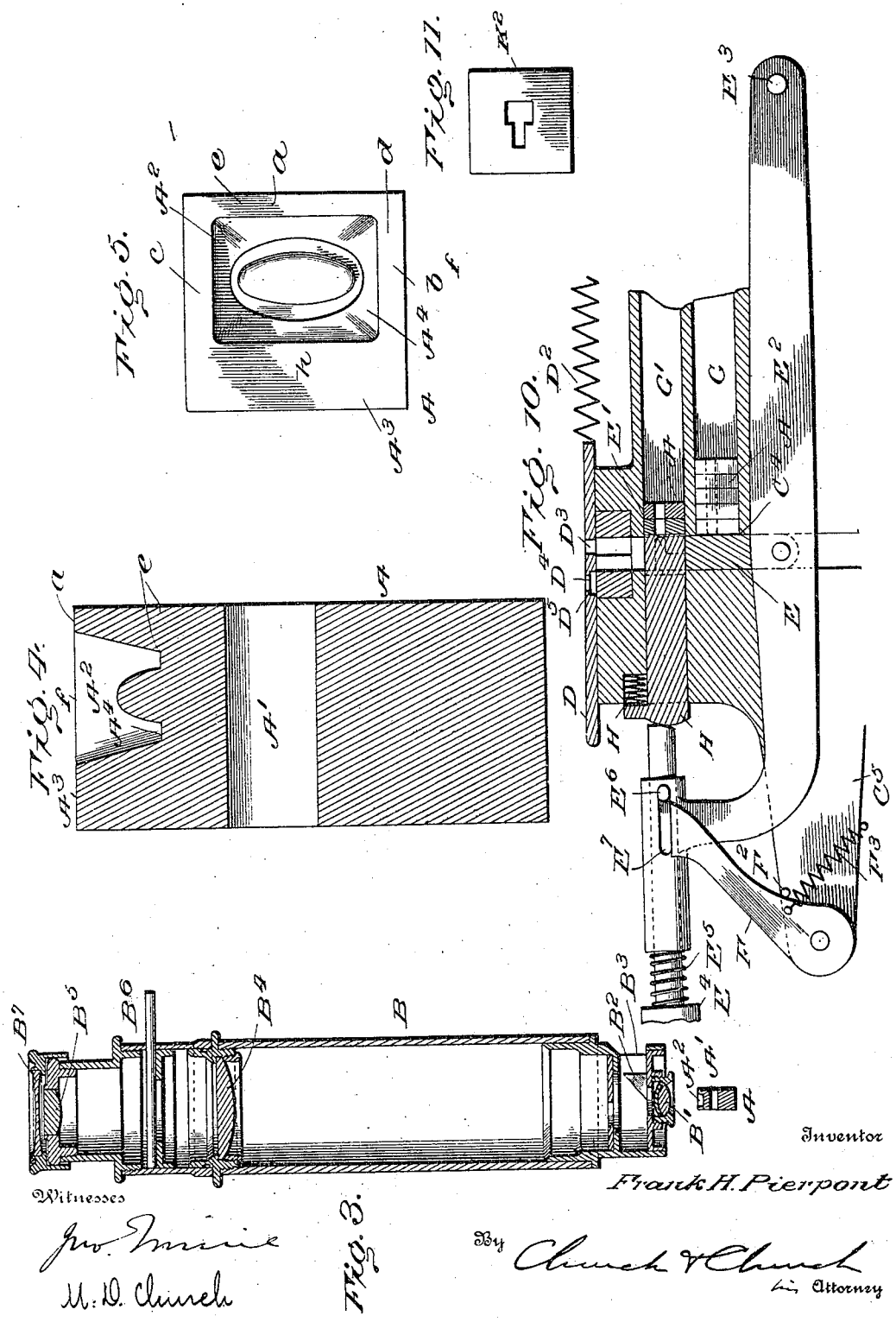

No. 808,112.  
F. H. PIERPONT.  
PATENTED DEC. 26, 1905.  
STANDARDIZING OR MEASURING MACHINE FOR MATRICES.  
APPLICATION FILED APR. 29, 1903.  
6 SHEETS—SHEET 3.
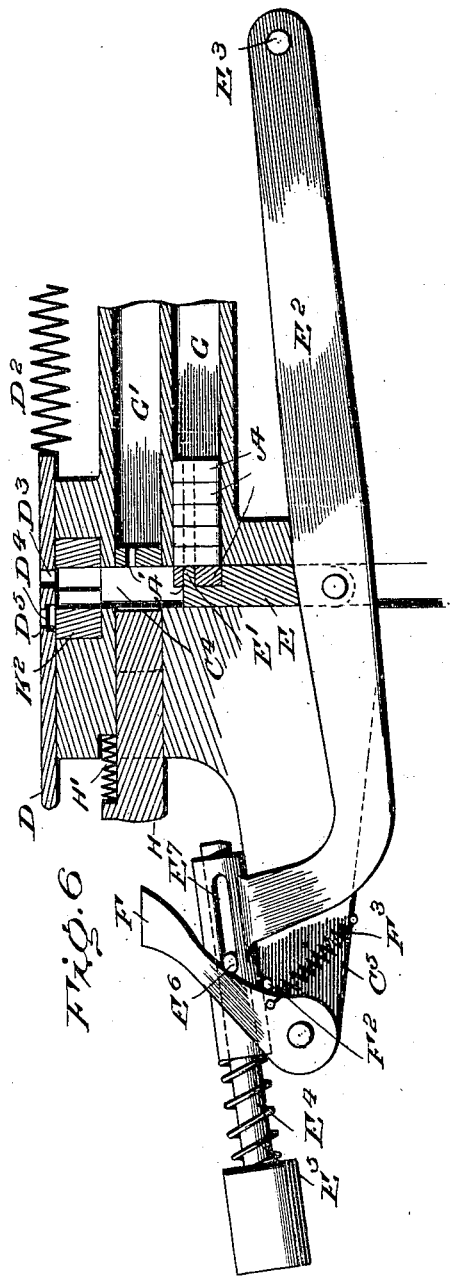
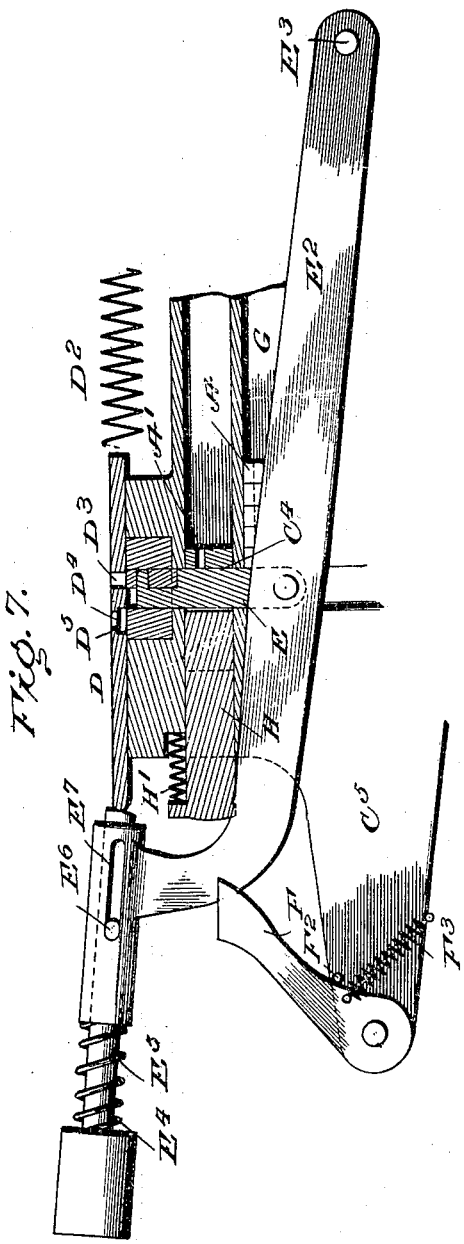
Witnesses
Inventor  
Frank H. Pierpont  
By Church & Church  
his Attorneys No. 808,112. PATENTED DEC. 26, 1905.
F. H. PIERPONT.
STANDARDIZING OR MEASURING MACHINE FOR MATRICES.
APPLICATION FILED APR. 29, 1903.
6 SHEETS—SHEET 4.
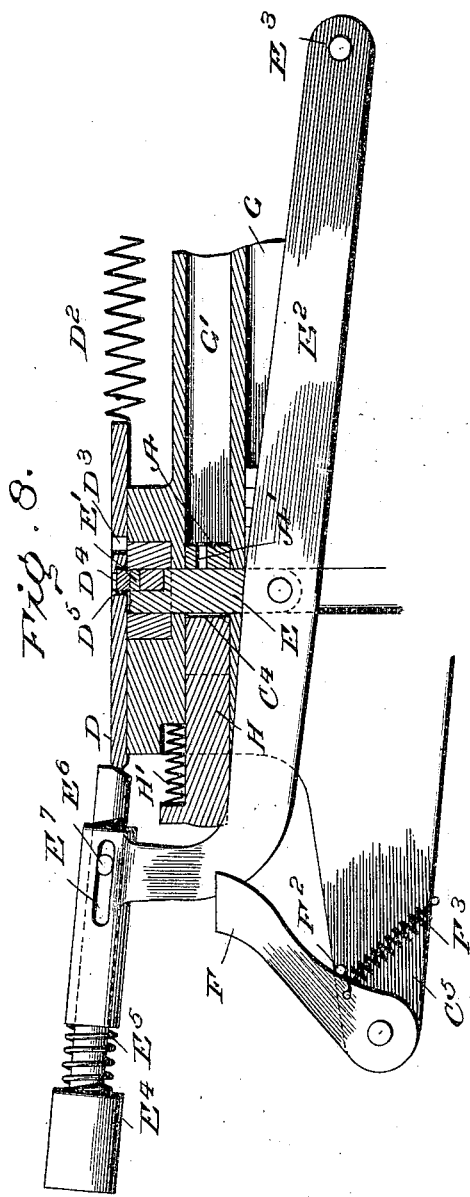
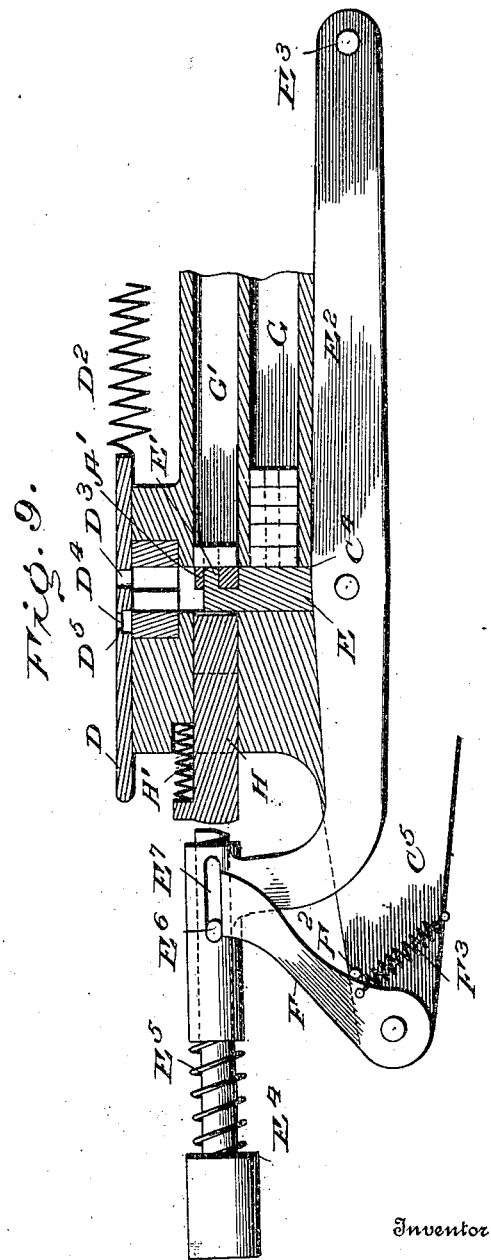
Witnesses
Inventor
Frank H. Pierpont
By Church & Church
Attorneys No. 808,112. PATENTED DEC. 26, 1905.
F. H. PIERPONT.
STANDARDIZING OR MEASURING MACHINE FOR MATRICES.
APPLICATION FILED APR. 29, 1903.
6 SHEETS—SHEET 5.
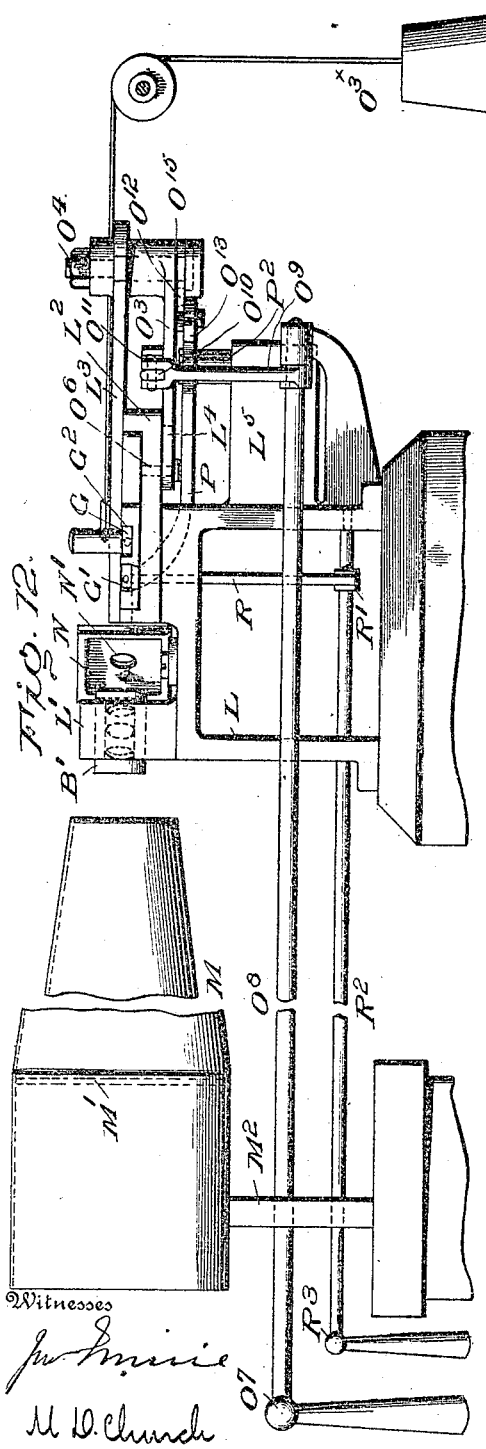
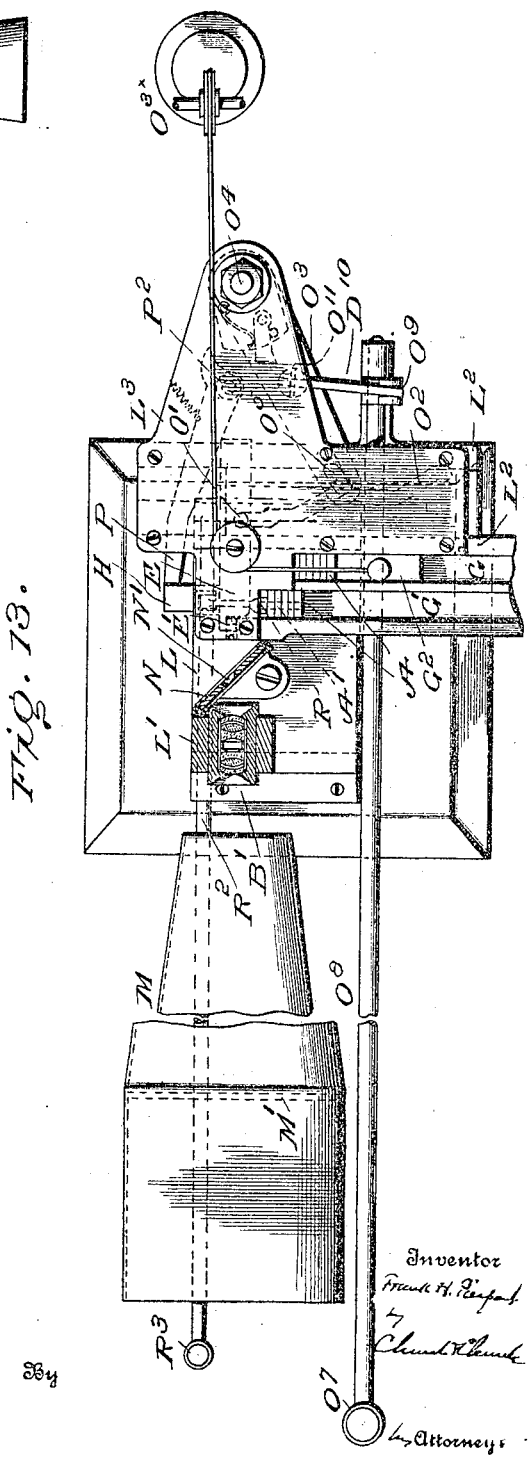

No. 808,112. PATENTED DEC. 26, 1905.
F. H. PIERPONT.
STANDARDIZING OR MEASURING MACHINE FOR MATRICES.
APPLICATION FILED APR. 29, 1903.
6 SHEETS—SHEET 6.
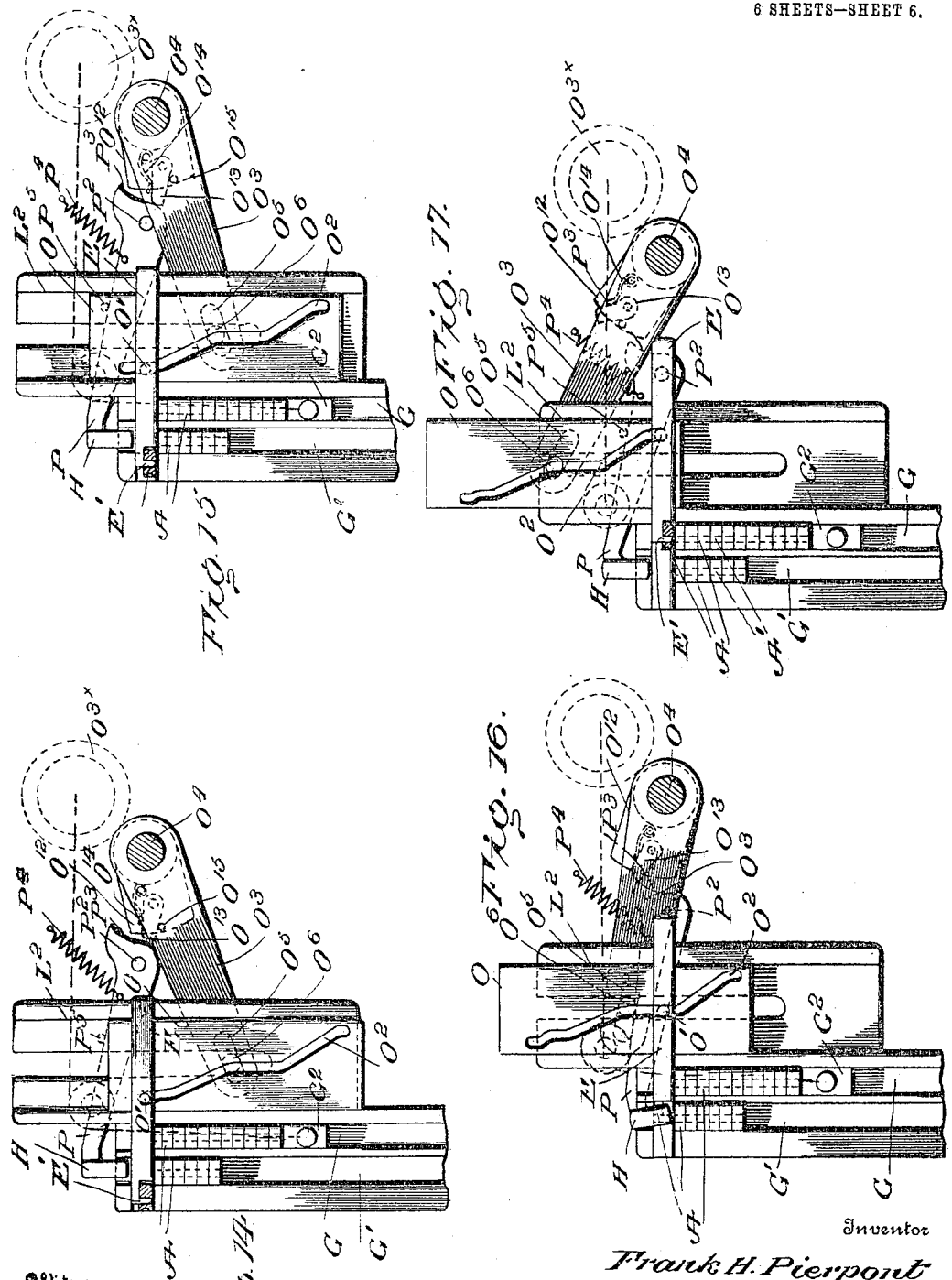
Witnesses
Inventor
Frank H. Pierpont
By Church & Church
his Attorneys

UNITED STATES PATENT OFFICE.

FRANK HINMAN PIERPONT, OF HORLEY, ENGLAND, ASSIGNOR TO LANSTON MONOTYPE MACHINE COMPANY, OF NEW YORK, N. Y., A CORPORATION OF VIRGINIA.

STANDARDIZING OR MEASURING MACHINE FOR MATRICES.

No. 808,112.     Specification of Letters Patent.     Patented Dec. 26, 1905.

Application filed April 29, 1903. Serial No. 154,876.

*To all whom it may concern:*

Be it known that I, FRANK HINMAN PIERPONT, a citizen of the United States, residing temporarily at Horley, county of Surrey, England, have invented certain new and useful Improvements in Standardizing or Measuring Machines for Matrices; and I do hereby declare the following to be a full, clear, and exact description of the same, reference being had to the accompanying drawings, forming a part of this specification, and to the letters of reference marked thereon.

This invention relates to a machine or apparatus for standardizing or measuring objects, such as matrices, punches, type, &c., where accuracy of form and position are of consequence, and has for its object to provide a means whereby the position and dimensions of the character, be it intaglio or cameo, can be readily and accurately determined in two or more planes—that is, in the plane of the surface of the matrix-block and in the plane of the surface of the character, either at the extreme depth of the cavity or at the extremity of the punch or type.

The present embodiment is especially adapted for standardizing the matrices for type-casting and similar machines and comprises as its principal elements a magnifying apparatus provided with a fixed objective and adapted either for direct vision or projection upon a screen, a standard pattern or scale, a vertical illuminator or prism, a blank or matrix carrier, and means for positioning the blank or its carrier so as to present the character in two fixed positions relatively to the objective, so that two sections of the article to be standardized will be successively presented in true focal relation thereto. Thus in the case of a matrix the surfaces at opposite extremes of the matrix-cavity will be successively presented in true focal relation to the objective. Devices are also provided for facilitating the feeding and removal of the matrices and for ejecting those found to be defective.

In the accompanying drawings, illustrating the preferred embodiment of the said invention, Figure 1 is a front elevation, and Fig. 2 a side elevation, of an apparatus arranged for direct vision. Fig. 3 is a longitudinal sectional view of the optical part. Fig. 4 is a sectional view, and Fig. 5 an end view, of a matrix shown on an enlarged scale. Figs. 6 to 10, inclusive, are diagrammatic views illustrating the matrix and its actuating mechanism in different positions during the measuring and storing operations. Fig. 11 is a plan view of the holding-die detached. Fig. 12 is a side elevation, and Fig. 13 is a top plan view, partly in section, of a modified form adapted for projection as distinguished from direct vision. Figs. 14 to 17, inclusive, are diagrammatic views of the matrix adjusting and feeding devices in different positions. Fig. 18 is a horizontal section on line A A, Fig. 2.

Similar letters designate like parts in the several figures.

The matrices upon which this machine is specially designed to operate are represented in Figs. 4 and 5, wherein A is a rectangular piece of metal, preferably bronze, with a hole A' extending transversely therethrough for the reception of the sustaining-rod. The letter-cavity $A^2$ is driven or otherwise formed in one end of the blank, and in the example illustrated it represents the letter "O." $A^3$ is the matrix-end surface, and $A^4$ the character-surface, constituting the two surfaces with reference to which the measurements or comparisons are to be made. The principal dimensions or measurements required are indicated by the small letters $a$, $b$, $c$, $d$, $e$, and $f$ in Figs. 4 and 5.

Referring specifically to the form of embodiment represented in Figs. 1, 2, and 3, a form adapted for direct vision, a frame is provided comprising a base C, with a vertical standard C" provided with a tubular portion $C^2$ for the reception of a tube B, the latter forming part of a microscope and carrying the objective B' in fixed position. Above the objective is located a prism $B^2$ for vertical illumination, to which end it is placed opposite openings $C^3$ $B^3$ in the frame and tube, respectively, said prism being so constructed and arranged that only those rays of light falling on a surface or surfaces at right angles to the optical axis will be reflected to the eye. Hence only those surfaces of the matrix to be observed—*i. e.*, the end of the blank and the bottom of the character—are made visible to the operator. The ocular comprises a field-lens $B^4$ and an eye-lens $B^5$ and is furnished with a slide $B^6$, upon which is marked the necessary scales or pattern. The distance between the ocular and objective being fired, adapting-lenses, of which one, $B^7$, is shown, are provided to adapt the instrument to eyes of varying vision. Several of these lenses, both plus and minus, varying by even dioptics, are usually supplied with each instrument. Beneath the objective and supported in horizontal guides or ways in standard $C'$ is a stop or gage plate D, of which the under surface, or that which contacts with the matrix, is at such a distance from the objective as to be in the exact focus of the microscope. In the plate D is formed an aperture $D^3$, slightly smaller than the end of the matrix, so that when the latter is advanced into contact with the plate opposite said aperture it will be positioned with its surface in perfect focus and for the most part exposed to view. Adjacent aperture $D^3$ is a second aperture $D^4$, whose lower portion is enlarged to form a shoulder $D^5$, the depth of said enlargement being exactly equivalent to the depth of the character-cavity $A^2$ of the matrix, Figs. 4 and 5. Consequently, when the matrix is advanced into contact with the shoulder $D^5$ the bottom surface $A^4$ of the matrix-cavity will be brought into focus. Thus the plate D constitutes a gage for locating the matrix with either of the two surfaces in exact focus. The plate D is held normally with the aperture $D^3$ opposite the objective by a spring $D^2$, encircling a pin $D'$, carried by said plate and interposed between the latter and a part of the frame.

The apparatus thus far described constitutes an efficient means for effecting the two measurements described, the matrix being manipulated by hand and held in contact first with one and then with the other gaging-surface, the plate D being shifted for the purpose; but by preference the apparatus is provided with automatic means for effecting the successive presentations, as will presently appear.

In the standard $A'$ immediately below the normal position of the aperture $D^3$ in gage-plate D is a guideway $C^4$ for the reception of the matrix-carrier E, whose upper end is offset and provided with a horizontal pin $E'$, adapted to form a working fit in the matrix-perforation $A'$. The offset end of the carrier is preferably narrower than the matrix to allow an ejector, hereinafter described, to pass by it and engage the matrix. To insure the accurate presentation of the matrix against the surfaces of the gages, the upper section of the guideway $C^4$ immediately below gage-plate D is preferably formed in an inserted die $K^2$, Fig. 11, accurately shaped to receive the offset portion of the matrix-carrier and the matrix.

The carrier E is connected to a lever $E^2$, pivoted at $E^3$ to an extension of the standard $C'$ and having its outer end curved upward and provided with a guide to receive a pusher $E^4$, which latter is furnished with a handle and a retracting-spring $E^5$. The movement of the pusher is limited by a pin $E^6$, working in a slot $E^7$, and said pin projects into the plane of movement of an arm F, pivoted on lug $C^5$. The arm F is held by a spring $F^3$, normally in contact with a stop $F^2$.

Located one above another and to one side of the guideway $C^4$, with which they communicate, are two ways or slots G $G'$, forming, respectively, the feeding and the receiving galleys for the matrices. Mounted to reciprocate in ways in the standard and in line with galley $G'$ is an ejector H, provided with a spring $H'$ for holding it normally retracted out of the way of matrix-carrier E, the engaging end of said ejector being furcated to pass on opposite sides of the offset end of the carrier E and engage the matrix held thereon on both sides of said offset. A pusher K, Figs. 1 and 2, provided with a retracting-spring $K'$ and arranged to reciprocate transversely of the galley $G'$ near the receiving end, is provided for ejecting the last matrix delivered to the galleys should it be found defective.

The operation of the matrix-feeding devices will be best understood in connection with Figs. 6 to 10, inclusive. At the commencement of a cycle of operation the parts are as represented in Fig. 6, with the lever $E^2$ and attached carrier retracted, the gage-plate D in normal position, and the feeding-galley charged with matrices, of which latter the innermost one has been advanced onto pin $E'$ of the carrier. The operator grasping the end of pusher $E^4$ raises lever $E^2$ and carrier E until the end surface of the matrix on pin $E'$ is brought into close contact with the under surface of gage-plate D directly beneath aperture $D^3$. During this movement the pin $E^6$, carried by pusher $E^4$, engaging the under edge of arm F forces the latter back against the pressure of its spring (the spring $E^5$ being stronger than spring $F^3$) and passes above, when arm F returns against its stop $F^2$ and the parts assume the positions represented in Fig. 7. The operator now proceeds to make his readings or comparison with reference to the surface $A^3$ of the matrix which is now in focus and illuminated. Having finished these readings, the operator advances the pusher $E^4$ to shift the gage-plate D until its orifice $D^4$ is brought into position and slightly elevates lever $E^2$, thereby bringing the matrix into the position represented in Fig. 8, with its end surface in contact with the second gage $D^5$ and the surface $A^4$ at the bottom of the drive or matrix cavity in focus, whereupon the second set of readings or comparison is made. The pusher $E^4$ is now lowered slightly sufficiently to withdraw the matrix from gage-plate D and is then retracted until its pin $E^6$ stands above the top of arm F, which latter serves to arrest the pusher opposite the ejector H and the carrier with its matrix opposite the pusher and in line with the receiving-galley G', as seen in Fig. 9. The pusher is now pressed forward, advancing the ejector, to discharge the matrix into galley G' and at the same time carrying pin $E^6$ beyond arm F, as seen in Fig. 10, whereupon by a further downward movement of the pusher the parts are returned to the position indicated in Fig. 6 ready to receive and present the next succeeding matrix. Should the matrix on inspection be found not to be of standard dimensions, it can be expelled from the receiving-galley by means of pusher K.

The apparatus thus far described illustrates but one of many forms in which the principle of the present invention may be embodied, said principle involving as its distinguishing features the employment in connection with a magnifying instrument of gages for locating successive and predetermined sections of the matrix in fixed relation to the objective, so that the measurements or comparison with the standard patterns may be made in parallel planes, and this whether the fixed relation of the objective and matrix with respect to the gages is made effective by a movement of either of said parts—that is, whether the objective is moved to the gage, the matrix being fixed, or the matrix is moved to or by the gage, the objective being fixed, or both the matrix and objective are moved to or by the gage.

The modification shown in Figs. 12 to 17, inclusive, illustrates an embodiment of the invention wherein a projecting apparatus is substituted for the direct-vision instrument or microscope of the previously-described form, and the gaging devices operate through the matrix-carrier instead of directly upon the matrix in adjusting and determining the latter's position. For convenience the apparatus is disposed horizontally instead of vertically, the objective B' being supported in a lug L' of the frame L. Supported on a standard $M^2$ in line with and in front of the objective is a tube M, (preferably rectangular in cross-section, about six feet in length, and in shape a hollow truncated pyramid,) within which and near the larger end is arranged a screen M', of ground glass or other appropriate material on which the scales or patterns are ruled or with which they are associated. The matrix-carrier E, with offset and pin E', is mounted in guides on a plate $L^2$, in which latter are also formed the feeding and receiving galleys G G'. An equivalent form of vertical illuminator is interposed between the matrix-carrier and objective, (represented by a mirror N with central opening N'.) The matrix-carrier E is furnished with a pin O', engaging a cam-groove $O^2$ in a block O, the latter mounted to reciprocate in guides on plate $L^2$. This cam-groove $O^2$ serves both as actuator and gage for the matrix-holder and is so shaped that at each complete movement of the block O in either direction it places the matrix-carrier in four different definite positions for purposes hereinafter explained. The block O is reciprocated by an arm $O^3$, of which one end is pivotally carried by a bolt $O^4$, mounted on an extension $L^3$ of the cover of block O. In the other end of arm $O^3$ is a slot $O^5$, in which is engaged a pin $O^6$, carried by block O and passing through a slot $L^4$ in plate $L^2$. Movement is imparted to arm $O^3$ through a rod $O^8$, provided with a handle $O^7$ at one end and a link $O^{10}$, connected to arm $O^3$ by a universal joint $O^{11}$. The feed-galley G is provided with a block $G^2$, connected to a suspended weight $O^3$ for advancing the column of matrices. The ejector H is carried by an arm P, pivoted on pin $P^2$. To the arm $O^3$ is secured a plate $O^{12}$, carrying a pawl $O^{13}$, which is normally held against a stop $O^{15}$ by a spring $O^{14}$. The pawl engages the curved end of the ejector-carrier P, this curve $P^3$ being so shaped that as the arm moves in the direction of the arrow, Fig. 15, the ejector is moved against the pressure of its spring to eject the matrix from its carrier, and when moved in the opposite direction after the ejector has been retracted by its spring, as in Fig. 17, the pawl yields, allowing the arm $O^3$ to swing back to initial position without again advancing the ejector. The operation is as follows: The operator, located at the larger end of tube M, turns the handle $O^7$ until the parts assume the position illustrated in Fig. 17, with the cam-block O at one extreme of its movement and the matrix-carrier retracted to present its offset end opposite the feeding-galley G, from which a matrix is advanced onto pin E'. Upon reversing the motion of the handle the cam-block is moved to the opposite end of its travel, as seen in Fig. 14, thus advancing the matrix-carrier to the extreme limit of its forward motion and bringing the bottom of the matrix-cavity in true focal relation with the objective. This portion of the groove $O^2$ constitutes the first gage for positioning the matrix, and as the measurement for position is taken from the rear end instead of the face end of the matrix this arrangement affords means for gaging the length of the matrix, as well as the position and dimensions of the character. Again reversing the movement of the handle $O^7$ the matrix-carrier is retracted to the position indicated in Fig. 15, thereby bringing the end surface of the matrix into the focal plane, for which purpose the cam-groove again acts as the gage for the second comparison. After the measurements for this position have been completed the handle is again moved to advance the cam-plate, thereby retracting and holding the carrier in the position indicated in Fig. 16 and causing the pawl to engage the curved end of the ejector and advance the latter to discharge the examined matrix into the receiving-galley. A further movement of the handle brings the carrier back to initial position, as in Fig. 17. A pusher R, operated by an arm R' on rod R², the latter provided with a handle R³, may be employed for removing defective matrices as they are delivered to the receiving-galley.

Having thus described my invention, what I claim as new, and desire to secure by Letters Patent, is—

1. In a matrix-standardizing machine, the combination with a magnifying apparatus and a matrix-carrier relatively movable in a plane parallel with the optical axis of said magnifying apparatus, of a gage for positively positioning the matrix and operating to expose successive sections thereof in true focal relation to the objective of the magnifying apparatus; substantially as described.

2. In a matrix-standardizing machine, the combination with a magnifying apparatus provided with a fixed objective of a matrix-carrier and a gage provided with a plurality of gaging-surfaces for positively positioning the matrix in either of two positions relative to the focal plane of the objective; substantially as described.

3. In a matrix-standardizing machine, the combination with a magnifying apparatus provided with a fixed objective and a vertical illuminator, of a matrix-carrier movable toward the objective and a gage for positively and successively locating different sections or faces of the matrix in the focal plane of the objective; substantially as described.

4. In a standardizing-machine for matrices the combination of the following elements, to wit, a magnifying apparatus provided with a vertical illuminator and a standard pattern or scale; means for guiding the matrix in the plane of the optical axis; a matrix-carrier; and a gaging device adapted to positively arrest the matrix in either of two predetermined positions, to successively expose its end surface and the surface of the character in the focal plane of the magnifying apparatus; substantially as described.

5. In a standardizing-machine for matrices the combination of the following elements, to wit; a magnifying apparatus provided with a fixed objective and a standard pattern or scale; guiding devices for maintaining the matrix in line and confining its motion to one parallel with the optical axis of the objective; and a duplex gage operating to positively arrest the matrix in either of two positions, to successively present successive surfaces in the focal plane of the objective; substantially as described.

6. In a standardizing-machine for matrices, the combination of the following elements, to wit; a magnifying apparatus provided with a fixed objective and a vertical illuminator; a matrix-guide; and a gage-plate movable transversely of the matrix-guide and provided with two gaging-surfaces, the one for positioning the end surface of the matrix at the focus of the objective and the other for similarly positioning the bottom surface of the matrix-cavity.

7. In a standardizing-machine for matrices the combination of the following elements, to wit; a magnifying apparatus with fixed objective and vertical illuminator; a matrix-guide parallel with the optical axis of the magnifying apparatus; and a gage-plate movable laterally of said guide and provided with graded engaging surfaces for positioning the matrix.

8. In a standardizing-machine for matrices, the combination of the following elements, to wit; a magnifying apparatus with fixed objective and vertical illuminator; a matrix-guide opposite the objective and parallel with the optical axis thereof; an apertured gage-plate provided with stepped engaging surfaces and movable transversely of the matrix-guide.

9. In a standardizing-machine, for matrices, the combination of the following elements, to wit; a magnifying apparatus with fixed objective and vertical illuminator; a matrix-guide; an apertured gage-plate provided with two gaging-surfaces located in different planes and movable transversely of the matrix-guide; and a matrix-carrier for shifting the matrix in its guide with reference to the gage.

10. In a standardizing-machine for matrices, the combination of the following elements, to wit; a magnifying apparatus; a matrix-carrier provided with means for retaining the matrix; a feeding-galley and an ejector.

11. In a standardizing-machine for matrices, the combination of the following elements, to wit; a magnifying apparatus; a gage, and a reciprocating matrix-carrier provided with an offset end and a pin.

12. In a machine such as described, the combination of the following elements, to wit; a magnifying apparatus; a matrix-carrier; a gage for positioning the matrix; a feeding-galley; and an ejector.

13. In a machine such as described, the combination of the following elements, to wit; a magnifying apparatus; a gage; a matrix-carrier; an ejector; and an actuating mechanism or device for controlling the movements of the matrix-carrier, gage and ejector.

14. In a machine such as described, the combination of the following elements, to wit; a movable matrix-carrier provided with an offset and pin for receiving and holding the matrix and a stepped gage-plate movable transversely of the line of movement of said carrier, to present different gage-surfaces to the front face of the matrix.

15. In a machine such as described, the combination of the following elements, to wit; a matrix-carrier movable in guides and provided with an offset and retaining-pin; a stepped gage-plate movable transversely of said carrier to determine its position and that of the matrix; a feeding-galley; a receiving-galley and an ejector.

16. In a machine such as described, the combination of the following elements, to wit; a matrix-carrier; a stepped gage; a feeding-galley; a receiving-galley; an ejector; an actuating device for reciprocating the matrix-carrier; and means controlled by said actuating device for shifting the gage and actuating the ejector at the proper intervals.

17. In a machine such as described, the combination of the following elements, to wit; a matrix-carrier; a movable gage; an ejector; a lever connected to the matrix-carrier and carrying a plunger in a plane intersecting the gage and ejector; and a pivoted arm engaging a shoulder on said plunger for temporarily arresting the lever with its plunger in position to engage the ejector.

18. In a standardizing or measuring machine, the combination with a fixed objective, a vertical illuminator and a standard graduated scale or pattern, of a matrix-carrier, a gage and mechanism for reciprocating the carrier, to present the matrix successively in two fixed relations to the objective, substantially as and for the purpose set forth.

19. In a standardizing or measuring apparatus the combination with a fixed objective and a vertical illuminator, of a gage movable transversely of the axis of the objective at a fixed distance therefrom, and provided with means for positively gaging the position of the matrix in a direction substantially parallel with the axis of said objective.

20. In a machine such as described, the combination of the following elements, to wit; a magnifying apparatus; a stepped gage; a reciprocating matrix-carrier; an ejector; a receiving-galley; and a pusher for removing defective matrices as they are delivered to the galley.

FRANK HINMAN PIERPONT.

Witnesses:
ARTHUR NIBLACK,
WALTER E. ROCLEE.